United States Patent
Trulli, Jr. et al.

(10) Patent No.: US 12,517,790 B2
(45) Date of Patent: Jan. 6, 2026

(54) GDDR VDG AUTO-RECOVERY

(71) Applicant: Dell Products L.P., Hopkinton, MA (US)

(72) Inventors: Dennis Trulli, Jr., Hudson, MA (US); Peter Callewaert, Eernegem (BE)

(73) Assignee: Dell Products L.P., Hopkinton, MA (US)

( * ) Notice: Subject to any disclaimer, the term of this patent is extended or adjusted under 35 U.S.C. 154(b) by 98 days.

(21) Appl. No.: 18/508,295

(22) Filed: Nov. 14, 2023

(65) Prior Publication Data
US 2025/0156276 A1    May 15, 2025

(51) Int. Cl.
*G06F 11/14* (2006.01)
*G06F 11/07* (2006.01)

(52) U.S. Cl.
CPC ...... *G06F 11/1438* (2013.01); *G06F 11/0772* (2013.01); *G06F 11/1464* (2013.01); *G06F 2201/84* (2013.01)

(58) Field of Classification Search
CPC ............. G06F 11/1438; G06F 11/0772; G06F 11/1464
See application file for complete search history.

(56) References Cited

U.S. PATENT DOCUMENTS

| | | | | |
|---|---|---|---|---|
| 10,423,609 | B1* | 9/2019 | Strauss | G06F 16/128 |
| 10,664,190 | B1* | 5/2020 | Hartford | G06F 3/0619 |
| 10,891,205 | B1* | 1/2021 | Trulli, Jr. | G06F 11/2079 |
| 2020/0042183 | A1* | 2/2020 | Meiri | G06F 3/065 |
| 2020/0233582 | A1* | 7/2020 | Chen | G06F 3/065 |
| 2022/0215111 | A1* | 7/2022 | Ekins | G06F 21/6218 |
| 2022/0263897 | A1* | 8/2022 | Karr | G06F 11/1448 |
| 2023/0305727 | A1* | 9/2023 | Blea | G06F 3/0665 |
| 2023/0409535 | A1* | 12/2023 | Kashi Visvanathan | G06F 16/1844 |

* cited by examiner

*Primary Examiner* — Jigar P Patel
(74) *Attorney, Agent, or Firm* — Anderson Gorecki LLP

(57) ABSTRACT

A data protection server running on a Geographically Dispersed Disaster Restart (GDDR) node provides auto-restart of generation of snapsets of versioned data groups (VDGs). Queries are sent to remotely monitor the state of VDG snapset generation at each of a plurality of datacenters at which a host application image is replicated and snapped. Responsive to determining that snapset generation of a VDG at a remote site has ceased, a command is sent to that site to prompt auto-restart of generation of snapsets of the VDG. If the VDG is undefined at the remote site, then a command is sent to the remote site to prompt auto-import of a definition of the VDG before auto-restarting generation of snapsets of the VDG. Either or both auto-import and auto-restart may be enabled or disabled for different VDGs, and auto-restart may be suspended if the VDG data is frozen.

18 Claims, 4 Drawing Sheets

GDDR VDG AUTO-RECOVERY

TECHNICAL FIELD

The subject matter of this disclosure is generally related to electronic data storage.

BACKGROUND

Electronic data storage is a critical infrastructure for organizational processes. A typical datacenter includes clusters of server computers and multiple data storage nodes that are interconnected via network switches. The servers run instances of host applications that support organizational processes such as email, accounting, inventory control, e-business, and engineering. Host application data is maintained by the storage nodes. A host application image is a collection of logical disk drives, known as storage objects, on which all the data for a single host application is maintained. The host application image may be replicated at different data centers to enable failover without significant interruption of the host applications. The replicas may be further protected by creating incremental backups known as snapshots that enable the host application image to be restored to its state at an earlier point in time.

Cyber-attacks on datacenters are a growing problem. A ransomware attack, for example, is designed to render host application data inaccessible so that the attacker can demand payment of a ransom in exchange for restoration of data accessibility. Ransomware can render data inaccessible by encrypting the data and by locking storage objects on which the data is stored. Ransomware may initially infect only a single host server in a single datacenter. However, the ransomware infection can spread from the host server to the storage arrays, and from the storage arrays to other data centers via replication.

SUMMARY

A method in accordance with some implementations comprises sending queries to remotely monitor state of versioned data group snapset generation at each of a plurality of datacenters at which a host application image is replicated and snapped; and responsive to determining that snapset generation of a first versioned data group at a first datacenter has ceased, auto-restarting generation of snapsets of the first versioned data group by sending a command to the first datacenter.

In accordance with some implementations, a non-transitory computer-readable storage medium stores instructions that are executed by a computer to perform a method comprising sending queries to remotely monitor state of versioned data group snapset generation at each of a plurality of datacenters at which a host application image is replicated and snapped; and responsive to determining that snapset generation of a first versioned data group at a first datacenter has ceased, auto-restarting generation of snapsets of the first versioned data group by sending a command to the first datacenter.

An apparatus in accordance with some implementations comprises a geographically dispersed disaster restart node comprising non-transitory storage media and a processor, the geographically dispersed disaster restart node comprising a data protection server configured to send queries to remotely monitor state of versioned data group snapset generation at each of a plurality of datacenters at which a host application image is replicated and snapped, and responsive to determining that snapset generation of a first versioned data group at a first datacenter has ceased, auto-restarting generation of snapsets of the first versioned data group by sending a command to the first datacenter.

The summary does not limit the scope of the claims or the disclosure. All examples, embodiments, aspects, implementations, and features can be combined in any technically possible way and the method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
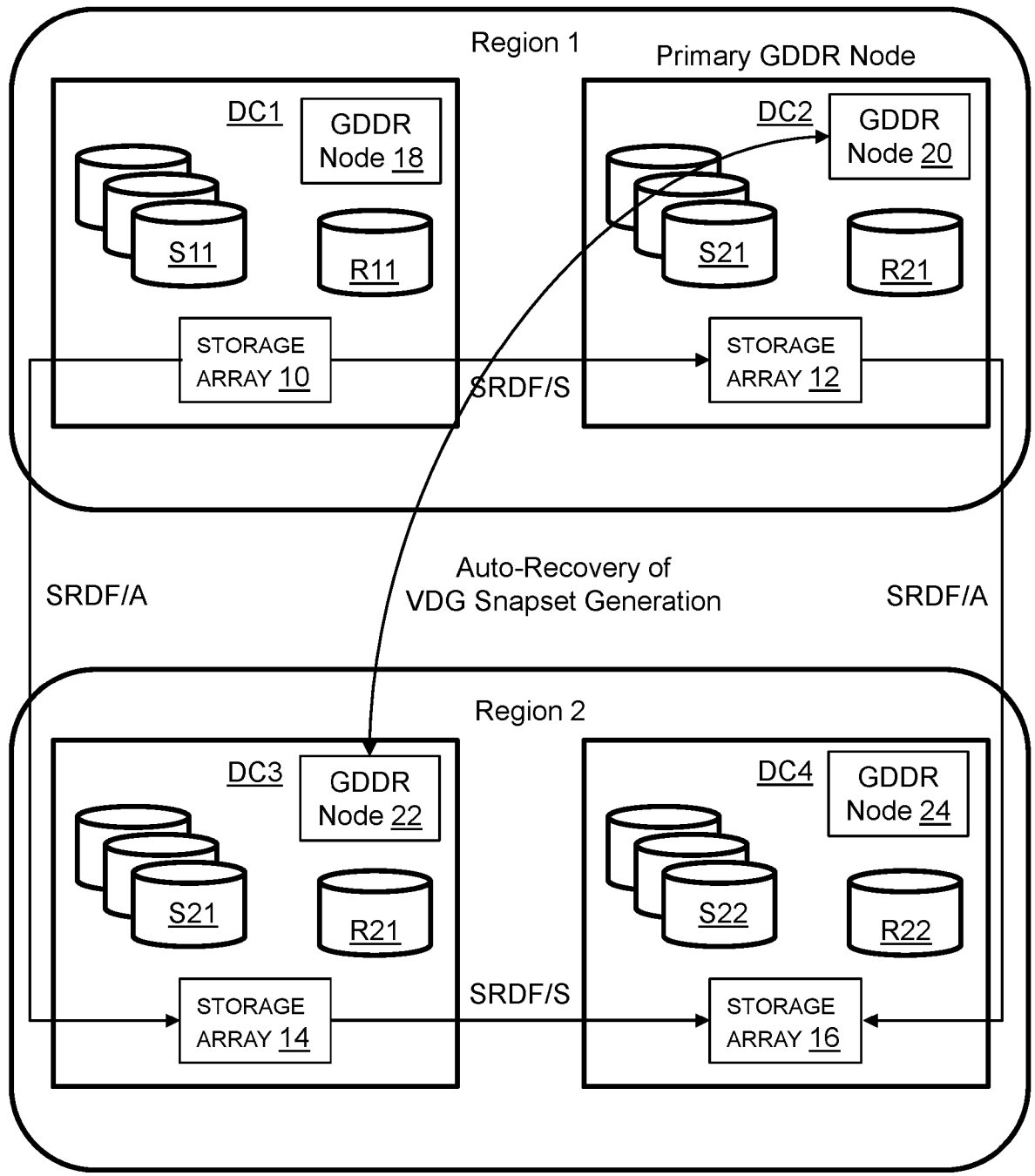
FIG. 1 illustrates a storage system with GDDR VDG auto-recovery.

FIG. 1 illustrates a storage system with Geographically Dispersed Disaster Restart (GDDR) Versioned data group (VDG) auto-recovery. The illustrated storage system, which is just one example of a storage system in which GDDR VDG auto-recovery can be implemented, includes four data centers DC1, DC2, DC3, DC4 deployed in two geographic regions labelled as region 1 and region 2. DC1 and DC2 are in region 1. DC3 and DC4 are in region 2. DC1, which is a primary site, includes a storage array 10 and GDDR node 18. DC2, which is a secondary site, includes a storage array 12 and GDDR node 20. DC3, which is a primary site, includes a storage array 14 and GDDR node 22. DC4, which is a secondary site, includes a storage array 16 and GDDR node 24. A dataset such as a host application image stored on storage objects of a VDG is maintained at DC1 by storage array 10 on replica R11. Replica R11 is synchronously replicated at DC2 on replica R21 by storage array 12. R11 is synchronously replicated by marking updated tracks of R11 as invalid until the changes are written to the synchronous remote replica R21 in DC2. More specifically, sets of changes are accumulated over a relatively short interval of time and sent from storage array 10 to remote storage array 12, which must return an acknowledgement of replication of the changes to storage array 10 before the updated tracks on R11 can be marked valid and accessed again by a host application. R11 is asynchronously replicated at DC3 on replica R21 by storage array 14. R11 is asynchronously replicated by writing updated tracks of R11 to the asynchronous remote replica R21. More specifically, sets of changes are accumulated over a relatively short interval of time and sent to remote storage array 14. However, storage array 10 does not wait for an acknowledgement of replication of the changes by storage array 14 before marking the updated tracks as valid. Asynchronous replication may be more practical to implement when acknowledgment receipt latency would be too disruptive to host application performance. Acknowledgment receipt latency is at least in part a function of geographical distance and network latency.

Snapshots of replicas are created to enable restoration of the replicas to their state at any of multiple prior points in time. A snapshot is an incremental copy of a storage object that contains only the changes since the most recent snapshot of that storage object was created. A time-series of snapshots can be used together to restore a storage object to a point in time before the most recently generated snapshot. A set of snapshots of the group of storage objects that contain a host application image is created in a coordinated manner to represent a single point in time so that the entire host application image can be restored to that single point in time. The set of such snapshots representing a host application image at a single point in time is known as a snapset and the corresponding storage objects are a VDG. Multiple snapsets representing a series of points in time of a VDG may be created and maintained. In the illustrated example, snapset S11 is created from replica R11. Snapsets S21 are created from replica R21 in the respective datacenters DC2, DC3. Snapset S22 is created from replica R12.

The GDDR nodes 18, 20, 22, 24 may be implemented on separate logical partitions of different mainframe computers at different sites. Each GDDR node monitors its local datacenter for failures such as inter-DC communication failures and failures associated with the local storage arrays. Each datacenter is depicted with a single storage array for purposes of explanation but would typically include two or more storage arrays. The GDDR nodes may be configured to automatically respond to failures by performing actions such as site swaps in which a primary site fails over to a secondary site so that production data remains accessible. One of the GDDR nodes is designated as the primary. As will be explained below, the primary GDDR node coordinates with the other GDDR nodes to manage auto-recovery of generation of snapsets of VDGs when VDGs cease to be snapped, which can occur for a variety of reasons.

Figure 2:
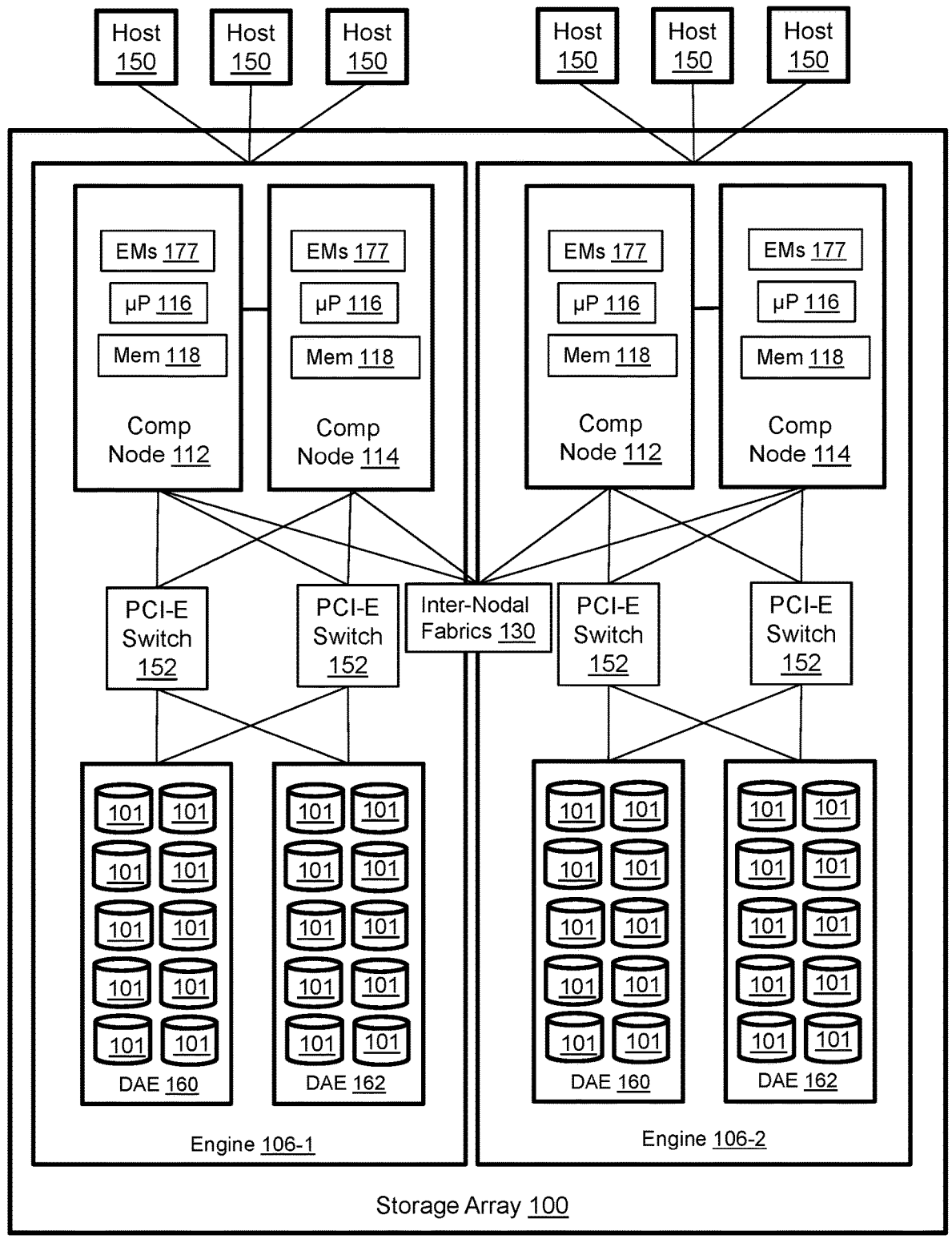
FIG. 2 illustrates a storage array in greater detail.

FIG. 2 illustrates an example of a storage array 100 in greater detail. The illustrated storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation.

Figure 3:
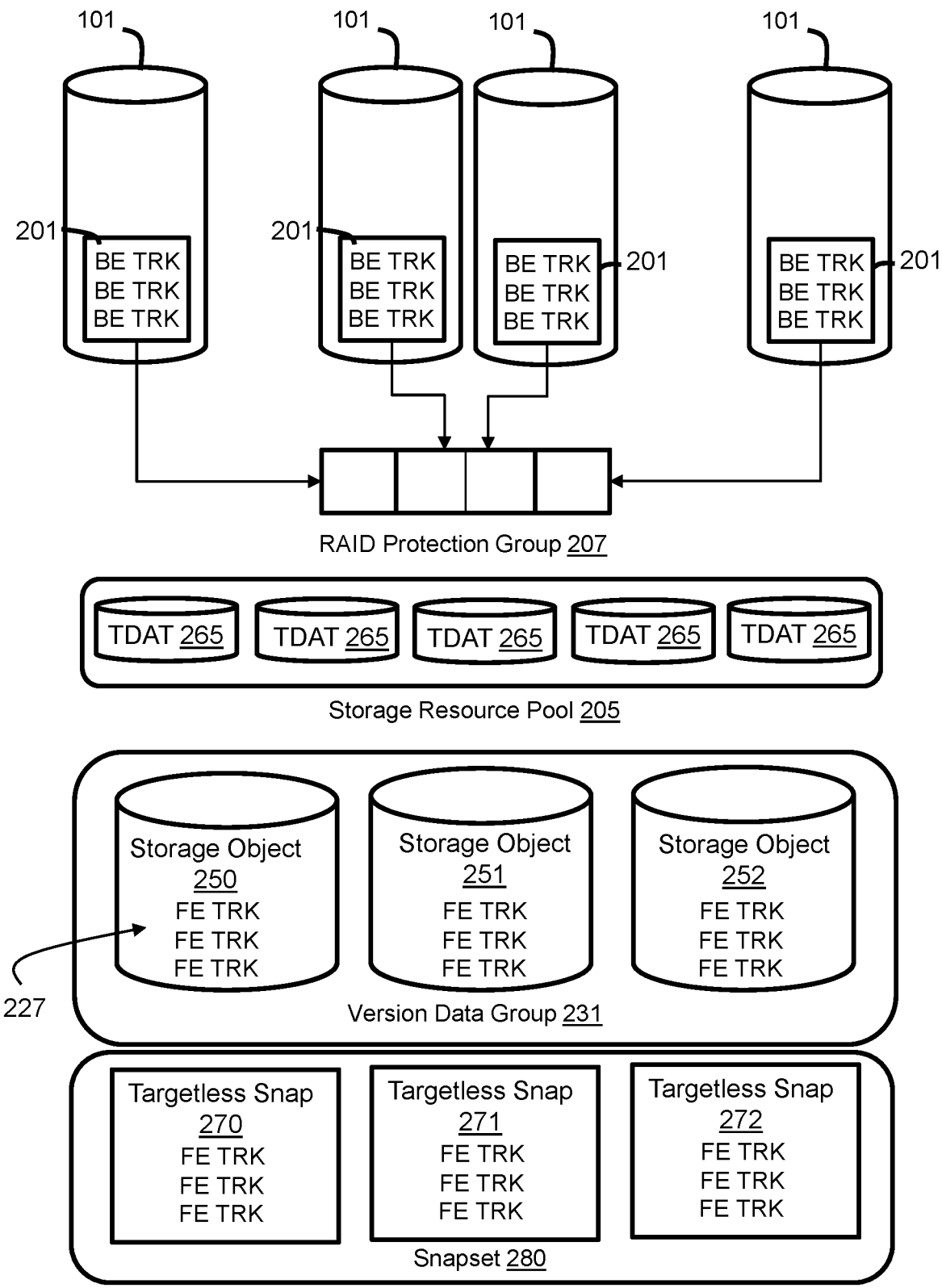
FIG. 3 illustrates how host application data is organized relative to the managed drives.

Referring to FIGS. 2 and 3, data that is created and used by instances of the host applications running on the host servers 150 is maintained on the managed drives 101. The managed drives are not discoverable by the host servers, so the storage array creates production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101.

IO services emulations running on the processors of the compute nodes maintain metadata that maps between the LBAs of the production storage objects 250, 251, 252 and physical addresses on the managed drives 101 in order to process IOs from the host servers. The basic allocation unit of storage capacity that is used by the compute nodes 112, 114 to access the managed drives is a back-end track (BE TRK). The managed drives are organized into same-size splits 201, each of which may contain multiple BE TRKs. Although individual drives can be configured as RAID group members, in the illustrated example a grouping of splits 201 from different managed drives is used to create a RAID protection group 207 with each split containing a protection group member. Specifically, splits from drives 101 are used to create RAID protection groups, such as RAID-5 or RAID-6. A storage resource pool 205 is a type of storage object that includes a collection of protection groups of the same RAID level on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A host application image contains all the production storage objects associated with an individual host application.

Data protection is implemented locally relative to the storage array by generating targetless snapshots of storage objects of VDGs. Each targetless snapshot represents the state of a storage object at a prior point in time and thus provides a recovery point for that storage object. A corrupted, maliciously locked, or maliciously encrypted storage object can be restored to an uncorrupted, unlocked, or unencrypted recovery point represented by an existing targetless snapshot, i.e., a targetless snapshot created before the corresponding storage object was affected by the ransomware attack. A snapset 280 of targetless snapshots 270, 271, 272 includes targetless snapshots of each storage object in a VDG 231. In the illustrated example, VDG 231 includes storage objects 250, 251, 252 and targetless snapshot 270 is a snapshot of storage object 250, targetless snapshot 271 is a snapshot of storage object 251, and targetless snapshot 272 is a snapshot of storage object 252. All targetless snapshots in a snapset instance have the same recovery point. The storage objects of the VDG are all associated with the same host application image, so maliciously encrypted data of a particular host application can be restored to a common recovery point using a corresponding snapset.

GDDR VDG auto-recovery helps to ensure that VDGs that are defined to GDDR for snapset generation remain defined locally so that snapset generation does not cease in an unplanned and undesired manner. An Event Monitor (EVM) associated with the primary GDDR node monitors local virtual data protection (zDP) servers on each GDDR node control system (C-system) by sending queries for VDG state information to the other sites. The VDG state information is stored in GDDR global variables and the global variables from multiple sites are aggregated on the primary C-system. The global variables are unique by zDP site (site of the zDP server), VDG site (site of the Direct Access Storage Devices (DASD) protected by the VDG), and VDG name. If a given VDG is found stopped or not defined at its zDP site, an alert is issued informing an administrator of the unexpected state, and auto-recovery is initiated. This is done in such a way that creation of snapsets of unchanged frozen data is avoided. GDDR EVM monitors GDDR production sites for liveliness to avoid creation of snapsets of frozen production data. VDG auto-recovery is implemented by sending zDP IMPORT and/or START commands to the zDP site and monitoring status via queries, all from the primary C-system. GDDR VDG auto-recovery provides an additional level of protection against cyber-attacks by helping to avoid interruption of VDG snapset protection.

GDDR VDG auto-recovery includes two distinct layers: auto-import and auto-restart. If a VDG definition is lost, the definition can be automatically imported from the SFS. If a VDG is stopped outside of GDDR control, it can be automatically restarted, ensuring snapsets continue to be created, unless the data at the protected site is identified as frozen. GDDR EVM identifies sites that are not expected to have their data updated and thus should not have VDGs from that site restarted. This involves querying the consistency-protected devices on each leg at each site. EVM maintains a list of frozen sites in a global variable. Frozen sites include: sites that are globally inaccessible; sites where the devices are unresponsive or not ready (UNR or RNR); R2 sites that are not R/W enabled for which the corresponding R1 devices are not ready (TNR) and/or ADCOPY-DISK or are only remotely mirrored from sites that are frozen (with a possible freezing cascade). Either or both layers can be enabled and disabled for a site/VDG. When enabled, the layers are complimentary. If a VDG definition is lost after a system IPL or SCF recycle, the definition is automatically imported from the FS. Once the import is complete, the VDG is then automatically restarted. If an error occurs importing or restarting a given VDG, e.g., no VDG definition exists in the SFS, auto-recovery is automatically disabled, and alerts are provided to the administrator to prompt resolution.

Figure 4:
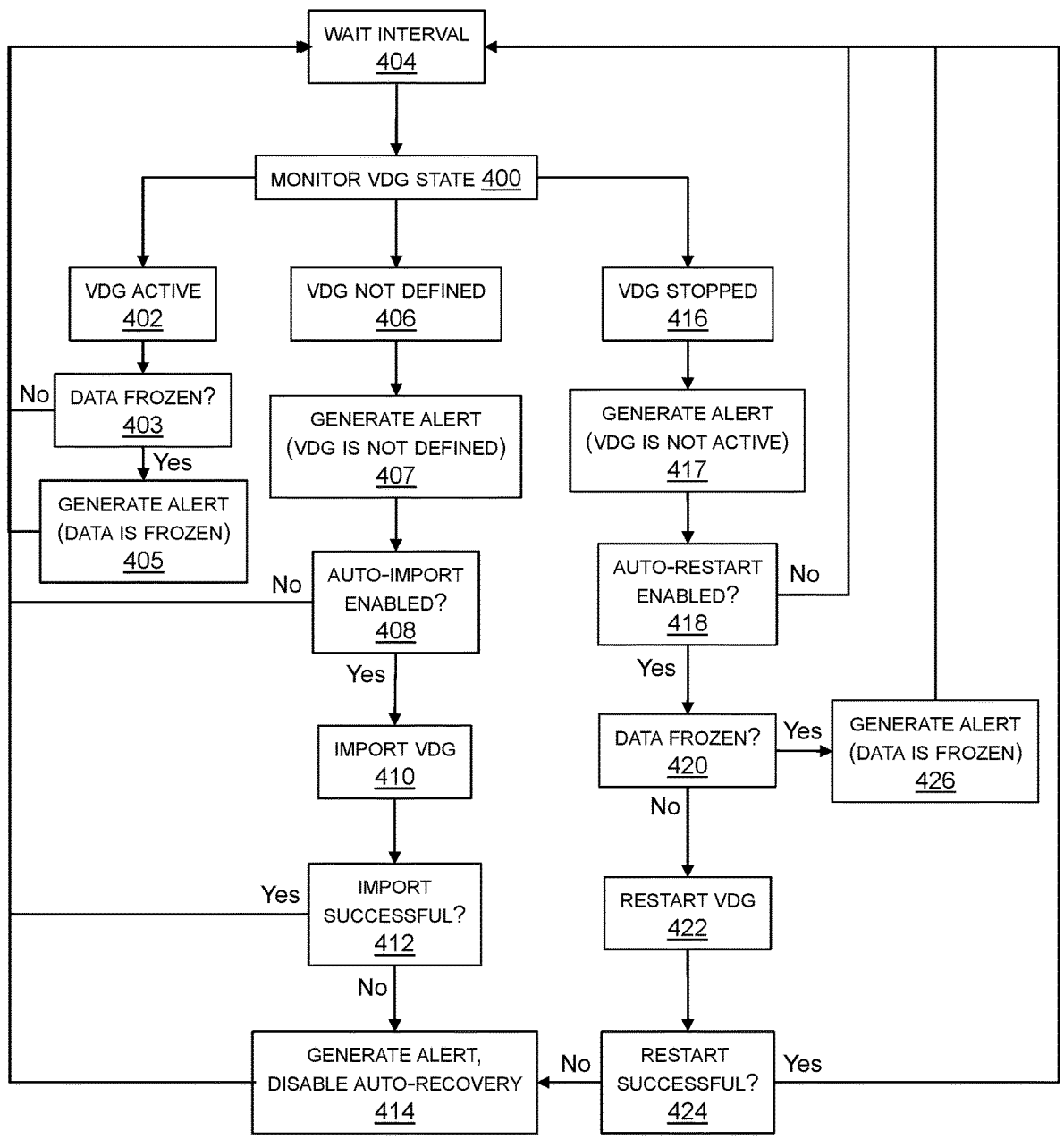
FIG. 4 illustrates a method for GDDR VDG auto-recovery.

FIG. 4 illustrates a method for GDDR VDG auto-recovery. Aspects of the method may be implemented by computer programs stored on non-volatile media and run on processors of the hardware described above. The primary GDDR node monitors VDG state as indicated in step 400. This may include the primary GDDR node sending queries to other GDDR nodes to prompt return of current VDG state global variables at each site. Each VDG at each site is monitored. In the case in which snapping of a VDG is determined to be active as indicated in step 402, a check for frozen data is performed at step 403. If the data is not frozen, then VDG state monitoring iterates after a wait interval in step 404. If the data is frozen, then an alert is generated in step 405 indicating that the data is frozen. Flow then proceeds to step 404.

In the case in which a VDG is determined to be undefined at its site as indicated in step 406, the primary GDDR node generates an alert indicating that the VDG is not defined as indicated in step 407 and checks whether the auto-import feature is enabled for that VDG as indicated in step 408. If auto-import is enabled, then the VDG definition is imported as indicated in step 410. For example, the primary GDDR node may send a command to the local GDDR node to prompt the local GDDR node to send an IMPORT command to the zDP server node to obtain the VDG definition. The SFS accessible to the local GDDR node contains all VDG definitions. If the VDG definition import is successful as determined in step 412, then flow proceeds to the auto-restart sequence following a wait interval in step 404 and monitoring of VDG state in step 400. If auto-import is disabled as determined in step 408, then flow proceeds to the wait interval of step 404. If VDG definition import is unsuccessful as determined in step 412, then an alert is generated, and auto-recovery is disabled as indicated in step 414.

In the case in which a VDG is determined to be defined at its site but snapset generation has ceased as indicated in step 416, the primary GDDR node generates an alert indicating that the VDG snapset generation is not active as indicated in step 417 and checks whether the auto-restart feature is enabled for that VDG as indicated in step 418. If auto-restart is enabled, then the GDDR node checks to determine whether the VDG data is frozen as indicated in step 420. If the VDG data is not frozen, then the primary GDDR node prompts the local GDDR node to restart VDG snapset generation as indicated in step 422. For example, the primary GDDR node may send a START command to the local GDDR node to prompt the local zDP server node to restart VDG snapset generation. If the restart is successful as determined in step 424, then monitoring of VDG state continues in step 400 following the wait interval of step 404. If auto-restart is disabled as determined in step 418, then flow proceeds to the wait interval of step 404. If the data is frozen as determined in step 420, then an alert is generated indicating that the data is frozen as shown in step 426, after which flow proceeds to step 404. If the restart is unsuccessful as determined in step 424, then an alert is generated for the administrator and auto-recovery is disabled as indicated in step 414.

Any of the GDDR nodes can be designated as the primary. Only one GDDR node is designated as the primary at any point in time, but the designation may be updated. For example, if the primary GDDR node becomes unavailable, then an available GDDR node may be designated as the primary.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. A method for auto-recovery in a storage system, comprising:
    a computer sending queries to remotely monitor state of versioned data group snapset generation at each of a plurality of datacenters at each of which a host application image is replicated and snapped by a respective storage array that comprises at least one compute node with microprocessors and computer-readable memory;
    responsive to determining that snapset generation of a first versioned data group at a first datacenter has ceased, the computer auto-restarting generation of snapsets of the first versioned data group by sending a command to the first datacenter; and
    responsive to determining that snapset generation of a second versioned data group at the first datacenter is active and that host application image data of the second versioned data group is frozen, the computer generating an alert.

2. The method of claim 1 further comprising halting auto-restart of generation of snapsets of the first versioned data group responsive to a determination that auto-restart is disabled for the first versioned data group.

3. The method of claim 2 further comprising halting auto-restart of generation of snapsets of the first versioned data group responsive to a determination that host application image data of the first versioned data group is frozen.

4. The method of claim 3 further comprising auto-importing a definition of the first versioned data group to the first datacenter responsive to a determination that the first versioned data group is undefined at the first datacenter.

5. The method of claim 4 further comprising halting auto-import of the definition of the first versioned data group responsive to a determination that auto-import is disabled for the first versioned data group.

6. The method of claim 5 further comprising generating an alert and disabling auto-recovery responsive to any of the following: import unsuccessful and restart unsuccessful.

7. An apparatus comprising:
    a geographically dispersed disaster restart node comprising non-transitory storage media and a processor, the geographically dispersed disaster restart node comprising a data protection server configured to:
        send queries to remotely monitor state of versioned data group snapset generation at each of a plurality of datacenters at which a host application image is replicated and snapped;
        responsive to determining that snapset generation of a first versioned data group at a first datacenter has ceased, auto-restart generation of snapsets of the first versioned data group by sending a command to the first datacenter; and
        responsive to determining that snapset generation of a second versioned data group at the first datacenter is active and that host application image data of the second versioned data group is frozen, generate an alert.

8. The apparatus of claim 7 further comprising the data protection server being configured to halt auto-restart of generation of snapsets of the first versioned data group responsive to a determination that auto-restart is disabled for the first versioned data group.

9. The apparatus of claim 8 further comprising the data protection server being configured to halt auto-restart of generation of snapsets of the first versioned data group responsive to a determination that host application image data of the first versioned data group is frozen.

10. The apparatus of claim 9 further comprising the data protection server being configured to prompt auto-importing of a definition of the first versioned data group to the first datacenter responsive to a determination that the first versioned data group is undefined at the first datacenter.

11. The apparatus of claim 10 further comprising the data protection server being configured to halt auto-import of the definition of the first versioned data group responsive to a determination that auto-import is disabled for the first versioned data group.

12. The apparatus of claim 11 further comprising the data protection server being configured to generate an alert and disable auto-recovery responsive to any of the following: import unsuccessful; and restart unsuccessful.

13. A non-transitory computer-readable storage medium storing instructions that are executed by a computer to perform a method for auto-recovery in a storage system, comprising:
    the computer sending queries to remotely monitor state of versioned data group snapset generation at each of a plurality of datacenters at each of which a host application image is replicated and snapped by a respective storage array that comprises at least one compute node with microprocessors and computer-readable memory;
    responsive to determining that snapset generation of a first versioned data group at a first datacenter has ceased, the computer auto-restarting generation of snapsets of the first versioned data group by sending a command to the first datacenter; and responsive to determining that snapset generation of a second versioned data group at the first datacenter is active and that host application image data of the second versioned data group is frozen, the computer generating an alert.

14. The non-transitory computer-readable storage medium of claim 13 in which the method further comprises halting auto-restart of generation of snapsets of the first versioned data group responsive to a determination that auto-restart is disabled for the first versioned data group.

15. The non-transitory computer-readable storage medium of claim 14 in which the method further comprises halting auto-restart of generation of snapsets of the first versioned data group responsive to a determination that host application image data of the first versioned data group is frozen.

16. The non-transitory computer-readable storage medium of claim 15 in which the method further comprises auto-importing a definition of the first versioned data group to the first datacenter responsive to a determination that the first versioned data group is undefined at the first datacenter.

17. The non-transitory computer-readable storage medium of claim 16 in which the method further comprises halting auto-import of the definition of the first versioned data group responsive to a determination that auto-import is disabled for the first versioned data group.

18. The non-transitory computer-readable storage medium of claim 17 in which the method further comprises generating an alert and disabling auto-recovery responsive to any of the following: import unsuccessful and restart unsuccessful.

* * * * *